United States Patent [19]
Capra

[11] 3,742,615
[45] July 3, 1973

[54] VEHICLE-DRYING APPARATUS
[76] Inventor: Uberto Capra, Alte Ceccato, Italy
[22] Filed: Feb. 18, 1972
[21] Appl. No.: 227,502

[30] Foreign Application Priority Data
Apr. 14, 1971  Italy.............................. 23179 A/71

[52] U.S. Cl..................................... 34/229, 34/222
[51] Int. Cl........................................... F26b 19/00
[58] Field of Search................. 34/222, 229, 243 C; 15/DIG. 2, DIG. 7, 405; 239/184–187; 222/3; 134/123

[56] References Cited
UNITED STATES PATENTS
2,016,125  10/1935  Snow ................................... 34/229
3,459,203  8/1969  Pritchard ............................. 34/229
3,613,255  10/1971  Capra ................................... 34/229

FOREIGN PATENTS OR APPLICATIONS
1,962,818  6/1971  Germany ........................ 15/DIG. 2

Primary Examiner—Kenneth W. Sprague
Assistant Examiner—James C. Yeung
Attorney—Karl F. Ross

[57] ABSTRACT

A portal frame, movable with reference to a vehicle to be dried, carries a pair of nozzles which are mutually offset in the direction of motion and are trained upon opposite slides of a vehicle entering the frame. The nozzles can be swung and/or shifted to blow upon the top of the vehicle in one traverse and upon its lateral surfaces in another traverse.

7 Claims, 3 Drawing Figures

VEHICLE-DRYING APPARATUS

My present invention relates to an apparatus for forcibly drying automobiles or other vehicles in a fixed or mobile vehicular washing station, e.g., as described in my prior U.S. Pat. No. 3,613,255.

In such installations it is known to support the drying nozzle or nozzles on a portal frame which straddles the path of a vehicle to be dried and which is movable with reference to the vehicle either by displaceably mounting the frame on a wheeled base or by letting the vehicle move slowly through the stationary frame.

Conventional systems of this type, designed to dry both the top and lateral surfaces of a vehicle at the same time, require powerful and therefore relatively costly blowers as their source of drying air. It is also necessary, in order to increase the efficiency of the blower system, to bring the nozzle outlets as close as possible to the vehicular surfaces; this complicates the designing of sensor-controlled suspension means for automatically raising and lowering the nozzles in accordance with the height of the vehicle.

The general object of my present invention is, therefore, to provide a simplified and low-cost drying apparatus for the purpose set forth.

More particularly, my invention aims at providing a system wherein only two nozzles, of reduced dimensions as compared with conventional devices, are needed to sweep the entire vehicular surface.

In accordance with this invention, a pair of nozzles on a portal frame or equivalent support are trained upon a vehicle from opposite sides and are provided with a mechanism for displacing same between a first and a second position, by translatory and/or rotary movement, to sweep the top surface of the vehicle during one traverse of its path and respective lateral surfaces thereof during another (earlier or later) traverse. Thus, during each traverse the two nozzles are trained upon only a portion of the vehicular surface so that their combined power may be low; the relatively narrow air stream issuing from each nozzle need not diverge very rapidly from the nozzle outlet so that each nozzle may remain well spaced from the surface to be dried. It is, therefore, possible to mount the two nozzles near opposite corners of the portal frame at an elevated level from which they can sweep the top and the sides of the vehicle.

Accordingly, the two nozzles are mutually offset in the direction of relative motion of the vehicle and the frame so that their jets do not interfere with each other in their top-drying position but strike the upper surface of the vehicle in staggered relationship. The extent of the offset should be equal to or greater than the effective width of each nozzle whose outlet is preferably of rectangular shape with its major sides perpendicular to the direction of motion, i.e., to the vehicular path.

Especially in the case of a washing station designed to accommodate vehicles widely varying in height, such as small passenger cars and large trucks, the nozzles could be suspended for limited raising or lowering under the control of suitable sensors, e.g., as described in my prior U.S. Pat. No. 3,613,255; in the side-drying position, the nozzles could also be lowered so as to strike the lateral surfaces of the vehicle more nearly perpendicularly.

The above and other features of my invention will be described in detail hereinafter with reference to the accompanying drawing in which.

Figure 1:
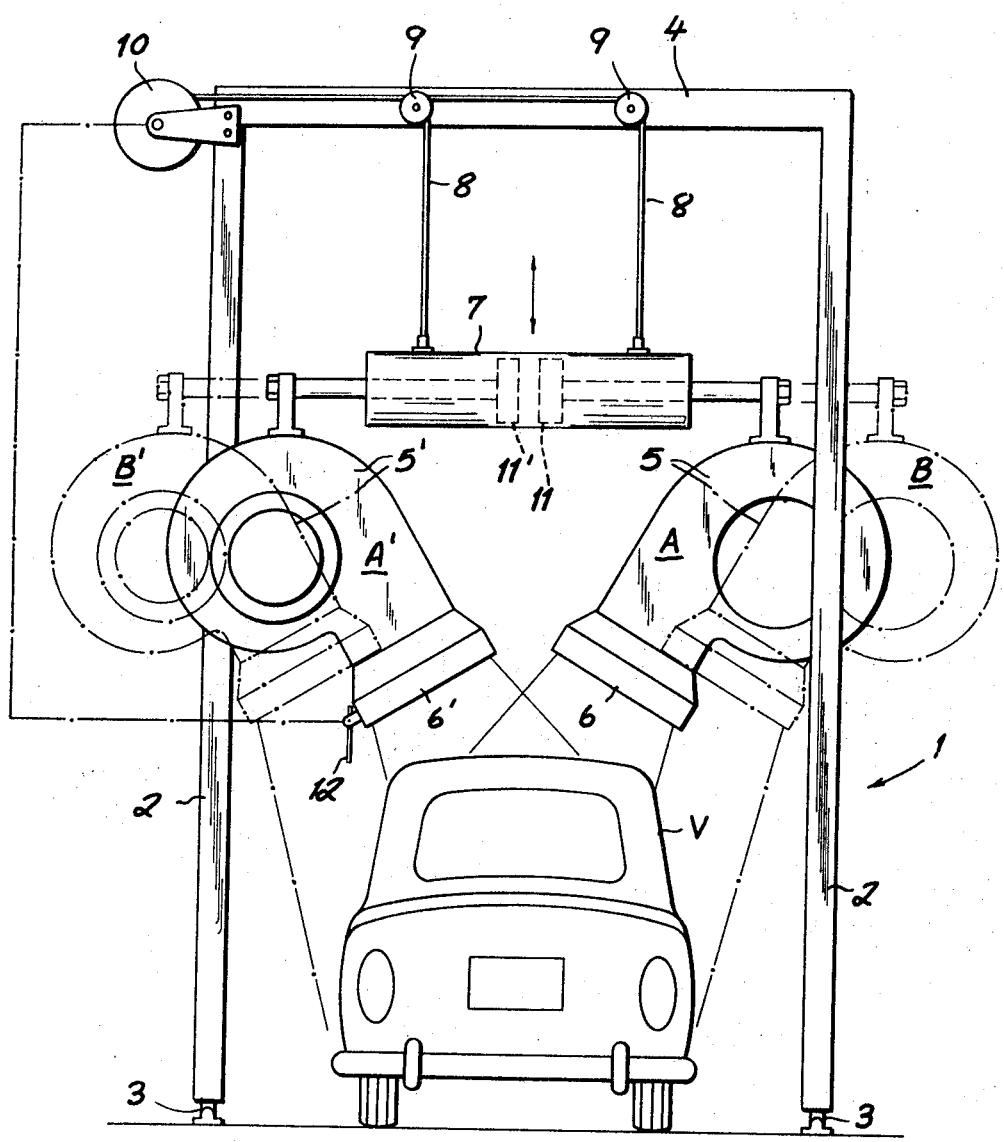
FIG. 1 is a front-elevational view of a drying apparatus embodying my invention.

In FIG. 1 I have shown a drying installation for freshly washed automotive vehicles, including a portal frame with jambs 2 and a lintel 4 straddling a vehicle V to be dried. The frame has a wheeled base riding on two rails 3 for reciprocating displacement, by drive means not further illustrated, in the longitudinal direction of the vehicle.

Two air blowers 5 and 5', terminating in respective nozzles 6 and 6', are suspended from lintel 4 with the aid of an elevatable support 7 hanging on cables 8 which are led over rollers 9 to a capstan 10, the support 7 forming a pair of pneumatic or hydraulic cylinders or jacks with pistons 11, 11' respectively engaging the blowers 5 and 5'. Although, for the sake of simplicity, these blowers have been illustrated as simply carried by the piston rods, the support 7 may form a horizontal guide track therefor which has not been illustrated.

Either or both nozzles may be provided with sensors, as diagrammatically illustrated at 12 for the nozzle 6', used for detecting the proximity of a vehicle surface and actuating the drive of capstan 10 to raise or lower the support 7 to vary the nozzle level in conformity therewith; sensor 12 may be a switch-controlled flap of the type disclosed in my above-identified prior patent.

In the position A, A' illustrated in full lines in FIG. 1, the axes of nozzles 6 and 6' are substantially trained upon the centerline of an upper surface of the vehicle V to be dried, such as the top of the hood or the roof of the car. The two nozzles are relatively staggered, in a manner more fully described hereinafter with reference to FIG. 3, as by being respectively mounted forwardly and rearwardly of the portal frame 1. In this position A, A' each nozzle is highly effective in drying the proximal half of that upper surface and also assists the other nozzle in drying the distal half. In order to sweep the lateral surfaces of the vehicle, the nozzles are moved laterally outwardly into the alternate position B, B' (dot-dash lines) by extension of the pistons 11 and 11'.

Figure 2:
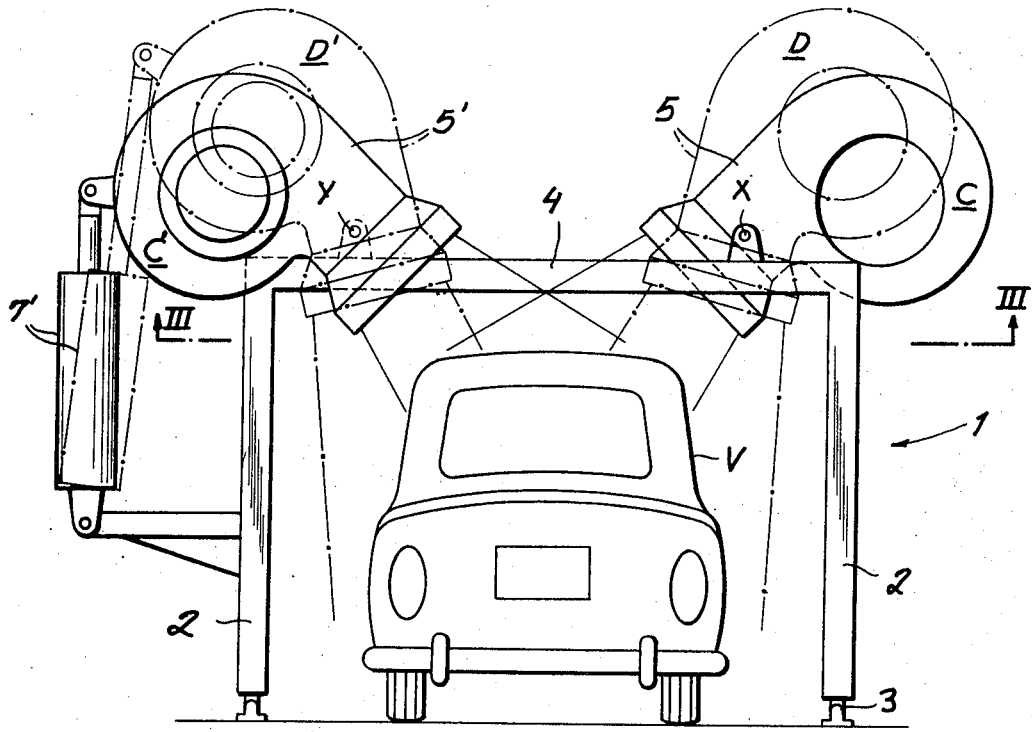
FIG. 2 is a view similar to FIG. 1, showing a modification.

As illustrated in FIG. 2, in which corresponding elements have been designated by the same reference numerals, the nozzles 6 and 6' (together with their blowers 5 and 5') could also be reoriented by a swinging motion about respective pivots X and Y. Thus, in position C, C' illustrated in full lines, the nozzles again sweep the top of the vehicle (hood, roof and trunk) whereas in their alternate position D, D' their jets are trained upon respective sides. The displacement from one position to the other is here effected by a pneumatic or hydraulic jack 7', shown only for the unit 5', 6', which may be controlled manually or automatically in the same manner as jack 7 (FIG. 1) in timed relationship with the frame drive to sweep the car from the sides and from the top (not necessarily in that order) in successive traverses. The two blowers can be interconnected by a common linkage, not shown, for joint motion in opposite directions; they could also be provided with individual orienting jacks such as the one illustrated at 7'.

Naturally, sensing means such as the flap 12 of FIG. 1 could also be used in connection with swingable blowers, such as those shown in FIG. 2, to raise or lower the nozzles according to the height of the vehicle to be dried.

Figure 3:
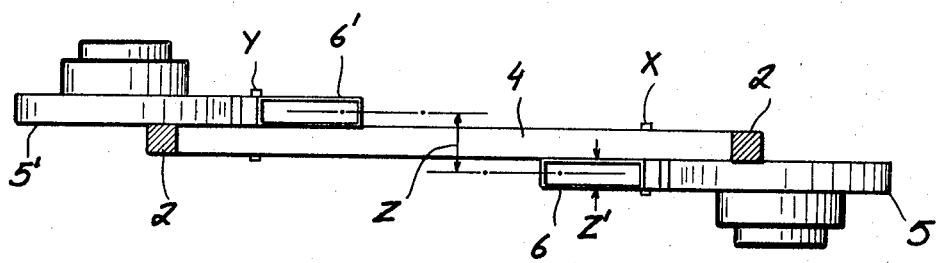
FIG. 3 is a cross-sectional view taken on the line III — III of FIG. 2.

FIG. 3 shows the rectangular outline of the nozzles 6 and 6' as well as their relative offset by a distance $z$ which exceeds the effective nozzle width $z'$.

Owing to the limitation of the width of the air stream issuing from these nozzles, the blowers 5 and 5' need not be as powerful as, say, in the system of my earlier patent and the sensing means 12, if provided, need not maintain a close spacing between these nozzles and the vehicle surface. Thus, the improved drying apparatus according to my present invention is simpler to construct, cheaper to operate and less expensive to maintain than comparable equipment of the prior art.

I claim:

1. An apparatus for drying freshly washed vehicles, comprising:
   a support above the path of a vehicle to be dried;
   a pair of nozzles on said support connected to a source of drying air, said nozzles being trained upon said vehicle from opposite sides of said path; and
   mechanism for displacing said nozzles for training same in a first position upon a top surface of said vehicle during one traverse of said path and in a second position upon respective lateral surfaces of said vehicle during another traverse.

2. An apparatus as defined in claim 1 wherein said nozzles are relatively offset in the direction of said path.

3. An apparatus as defined in claim 1 wherein said support comprises a portal frame straddling said path.

4. An apparatus as defined in claim 3 wherein said support further comprises movable suspension means for said nozzles on said frame, said nozzles being provided with sensing means coupled with said suspension means for automatically varying the level of said nozzles in conformity with the height of said vehicle.

5. An apparatus as defined in claim 3 wherein said nozzles are disposed near respective corners of said frame with their axes directed in said first position substantially upon the centerline of said top surface.

6. An apparatus as defined in claim 5 wherein said nozzles have outlets of generally rectangular cross-section with major sides transverse to said centerline.

7. An apparatus as defined in claim 6 wherein said nozzles are relatively offset, in the direction of said path, by a distance equal to at least the minor sides of said cross-section.

* * * * *